(12) United States Patent
Wu et al.

(10) Patent No.: US 8,581,875 B2
(45) Date of Patent: Nov. 12, 2013

(54) TOUCH PANEL, DISPLAY, AND MANUFACTURING METHOD OF TOUCH PANEL

(71) Applicant: Au Optronics Corporation, Hsinchu (TW)

(72) Inventors: Yuan-Chun Wu, Taoyuan County (TW); Hsin-Hung Lee, Hsinchu (TW); Mei-Sheng Ma, Taipei (TW); Kuo-Hsing Cheng, Hsinchu County (TW); Yu-Feng Chien, New Taipei (WF)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 13/739,004

(22) Filed: Jan. 11, 2013

(65) Prior Publication Data

US 2013/0127764 A1    May 23, 2013

Related U.S. Application Data

(63) Continuation of application No. 12/342,049, filed on Dec. 22, 2008.

(30) Foreign Application Priority Data

Aug. 20, 2008 (TW) .............................. 97131831 A (51) Int. Cl.
G06F 3/041 (2006.01)
H01J 9/00 (2006.01)

(52) U.S. Cl.
USPC ............................................. 345/173; 445/46

(58) Field of Classification Search
None
See application file for complete search history.

(56) References Cited

U.S. PATENT DOCUMENTS 4,550,221 A * 10/1985 Mabusth .................... 178/18.06

* cited by examiner

*Primary Examiner* — K. Wong
(74) *Attorney, Agent, or Firm* — Jianq Chyun IP Office (57) ABSTRACT

A touch panel including a substrate, at least one first sensing series and at least one second sensing series is provided. The first sensing series is disposed on the substrate and extends along a first direction. The first sensing series includes several first sensing pads and at least one first bridge line. The first bridge line connects two adjacent first sensing pads, and a material of the first bridge line differs from a material of the first sensing pads. The second sensing series is disposed on the substrate and extends along a second direction. The first direction is different from the second direction. The second sensing series includes several second sensing pads and at least one second bridge line. The second bridge line connects two adjacent second sensing pads.

21 Claims, 10 Drawing Sheets

TOUCH PANEL, DISPLAY, AND MANUFACTURING METHOD OF TOUCH PANEL

CROSS-REFERENCE TO RELATED APPLICATION

This application is a continuation application of and claims the priority benefit of a prior application Ser. No. 12/342,049, filed on Dec. 22, 2008, now pending. The prior application Ser. No. 12/342,049 claims the priority benefit of Taiwan application serial no. 97131831, filed on Aug. 20, 2008. The entirety of each of the above-mentioned patent applications is hereby incorporated by reference herein and made a part of this specification.

BACKGROUND OF THE INVENTION

1. Field of the Invention

The present invention relates to a touch panel, a display and a manufacturing method of the touch panel. More particularly, the present invention relates to a touch panel and a display which have high signal transmission quality and a manufacturing method of the touch panel.

2. Description of Related Art

As information technology, wireless mobile communication and information appliances have been rapidly developed and applied, to achieve more convenience, more compact and light volume and more human designs, various information products have changed from using conventional input devices such as key boards or mice to using touch panels as the input device.

Figure 1:
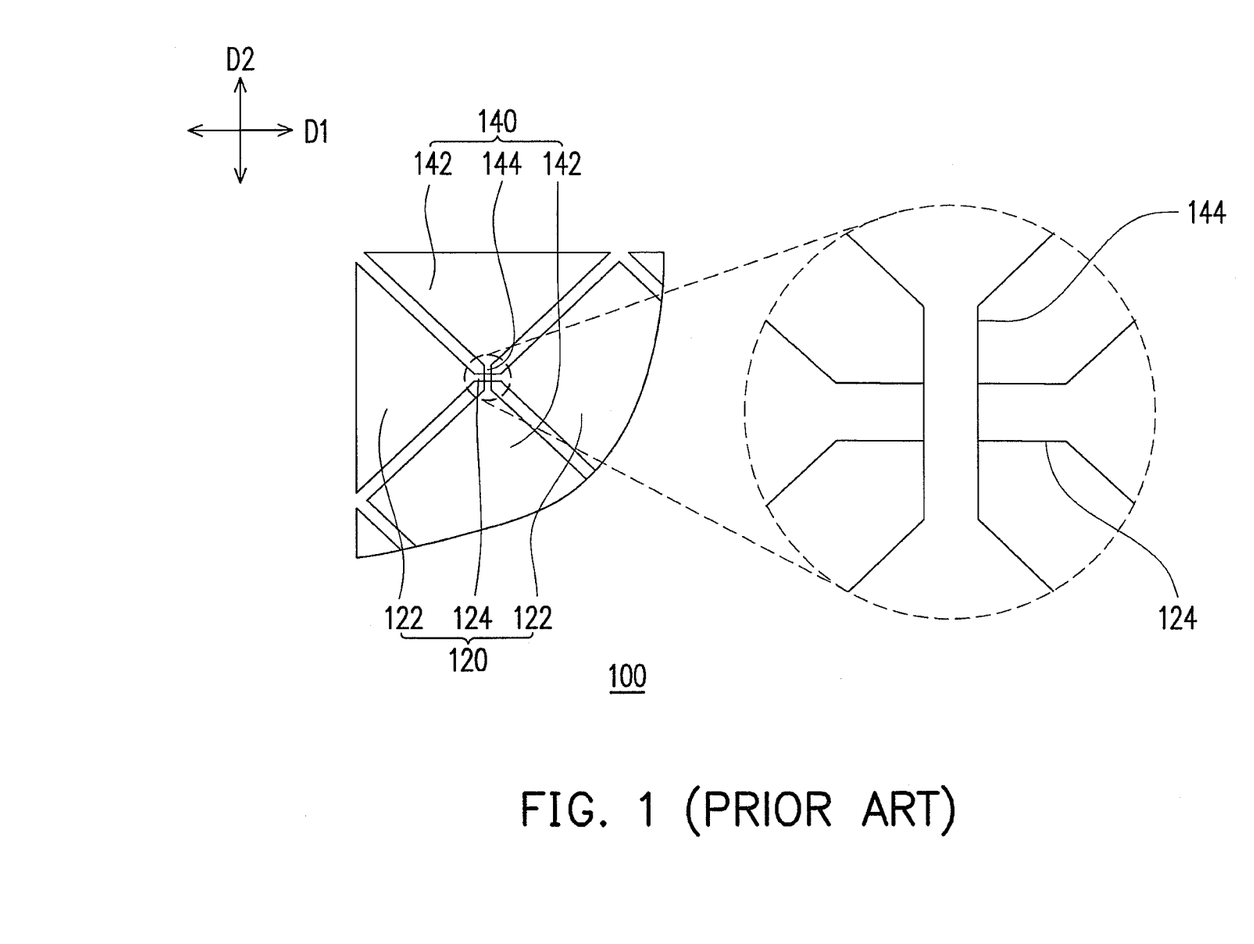
FIG. 1 shows a conventional touch panel.

FIG. 1 shows a conventional touch panel. To clearly explain the device design of the conventional touch panel, FIG. 1 only shows the structure of sensing series in the touch panel and omits other possibly present film layers or devices. As shown in FIG. 1, the conventional touch panel 100 includes a plurality of first sensing series 120 and a plurality of second sensing series 140. More specifically, the first sensing series 120 extend along a first direction D1. Each of the first sensing series 120 is constituted by connecting a first bridge line 124 to a plurality of first sensing pads 122. The second sensing series 140 extend along a second direction D2. Each of the second sensing series is constituted by connecting a second bridge line 144 to a plurality of second sensing pads 142. The first sensing pad 122 and the second sensing pads 142 may constitute a sensing array to achieve a surface sensing.

When a user touches the touch panel 100 with a finger, the first sensing series 120 and the second sensing series 140 of the touch panel 100 would cause a variation in capacitance on a position where the finger touches. Then obtain an appropriate instruction from the variation in capacitance to operate an electronic device. However, the first sensing pads 122, the second sensing pads 142, the first bridge line 124, and the second bridge line 144 are all manufactured with transparent conductive oxide such as indium tin oxide (ITO). Therefore, sheet resistances of the first bridge line 124 and the second bridge line 144 are larger because of the thinner line widths and may affect signal the signal transmission quality. Moreover, an intersection area between the first bridge line 124 and the second bridge line 144 has a larger parasitic capacitance and thus disadvantageous to calculation of the touch position. In other words, the conventional touch panel 100 may have issues of defective signal transmission and poor sensing sensitivity.

SUMMARY OF THE INVENTION

The present invention provides a touch panel to solve the issues of high sheet resistance and large parasitic capacitance occurring in the bridge lines in the conventional touch panel.

The present invention provides a touch panel including a substrate, a plurality of first sensing series and a plurality of second sensing series. The plurality of first sensing series are disposed on the substrate and extend along a first direction. One of the plurality of first sensing series includes a plurality of first sensing pads and a plurality of first bridge lines separated from one anther, wherein each of the first bridge lines is connected with two adjacent first sensing pads respectively, and a material of the first bridge lines is differing from a material of the first sensing pads. The plurality of second sensing series are disposed on the substrate and extend along a second direction. The first direction is different from the second direction.

According to an embodiment of the present invention, the material of the first sensing pads comprises transparent conductive oxide and the material of the first bridge lines comprises metal.

According to an embodiment of the present invention, one of the second sensing series includes a plurality of second sensing pads and a plurality of second bridge lines, wherein each of the second bridge lines is connected with two adjacent first sensing pads respectively, and a material of the second bridge lines is differing from a material of the second sensing pads.

According to an embodiment of the present invention, at least a portion of the second bridge lines have an electric conductivity higher than an electric conductivity of the second sensing pads. In practice, a material of the second sensing pads includes transparent conductive oxide, and a material of the second bridge lines includes metal.

According to an embodiment of the present invention, the first sensing pads are co-planar with the second sensing pads.

According to an embodiment of the present invention, the touch panel further includes a first dielectric layer disposed on the substrate to cover the first sensing series and the second sensing pads. The first dielectric layer has a plurality of windows, for example. The second bridge line is disposed on the first dielectric layer and electrically connected to the second sensing pads through the windows. Furthermore, the touch panel further includes a second dielectric layer disposed on the first dielectric layer, and the second bridge lines are connected to the second sensing pads through the windows. Meanwhile, the touch panel may further include a second dielectric layer disposed on the first dielectric layer and covering the first sensing series and the second sensing series.

According to an embodiment of the present invention, the touch panel further includes a first dielectric layer disposed on the substrate and covering the first sensing series. The first dielectric layer has a plurality of openings corresponding to the second sensing pads, for example. The second sensing pad is disposed inside the corresponding opening, and each of the second bridge lines crosses over the first dielectric layer between two adjacent openings and connecting the corresponding two adjacent second sensing pads. Meanwhile, the touch panel may further include a second dielectric layer disposed on the first dielectric layer and covering the first sensing series and the second sensing series.

According to an embodiment of the present invention, the touch panel further includes a first dielectric layer disposed on the substrate and covering the first bridge lines. The first sensing pads and the second sensing series are disposed on the first dielectric layer. In addition, the first dielectric layer has a plurality of windows, and the first bridge lines is connected to the first sensing pads through the corresponding windows. Meanwhile, the touch panel may further include a second dielectric layer disposed on the first dielectric layer and covering the first sensing series and the second sensing series.

According to an embodiment of the present invention, the touch panel further includes a plurality of fan-out traces disposed on the substrate. The fan-out traces are connected to the first sensing series and the second sensing series. A material of the fan-out traces is substantially the same as the material of the first sensing pads.

According to an embodiment of the present invention, the touch panel further includes a plurality of fan-out traces disposed on the substrate. The fan-out traces are connected to the first sensing series and the second sensing series. A material of the fan-out traces substantially differs from the material of the first sensing pads.

According to an embodiment of the present invention, a sheet resistance of the first bridge lines is about 0.01 ohm per square ($\Omega/\square$) to 1000 ohm per square ($\Omega/\square$), and a sheet resistance of the first sensing pads is about 0.01 ohm per square ($\Omega/\square$) to 1000 ohm per square ($\Omega/\square$).

According to an embodiment of the present invention, an electric conductivity of the first bridge lines is higher than an electric conductivity of the first sensing pads.

According to an embodiment of the present invention, a sheet resistance of the first bridge lines is lower than a sheet resistance of the first sensing pads.

The present invention further provides another touch panel including a substrate, a plurality of first sensing series, and a plurality of second sensing series. The plurality of first sensing series are disposed on the substrate and extend along a first direction. One of the plurality of first sensing series comprises a plurality of first sensing pads and a plurality of first bridge lines, wherein each of the first bridge lines is connected with two adjacent first sensing pads respectively, and a sheet resistance of the first bridge lines is lower than a sheet resistance of the first sensing pads. The plurality of second sensing series are disposed on the substrate and extend along a second direction, wherein the first direction is different from the second direction.

The present invention employs different conductive materials to manufacture the sensing pads and the bridge lines in the sensing series. Therefore, the touch panel, the display and the manufacturing method of the touch panel in the present invention improve the quality of signal transmission in the sensing series. For example, the bridge lines of the sensing series may be manufactured with using materials of high conductivity to reduce the sheet resistance of the overall signal transmission and simultaneously reduce the parasitic capacitance between the bridge lines.

To make the above and other objectives, features, and advantages of the present invention more comprehensible, several embodiments accompanied with figures are detailed as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2:
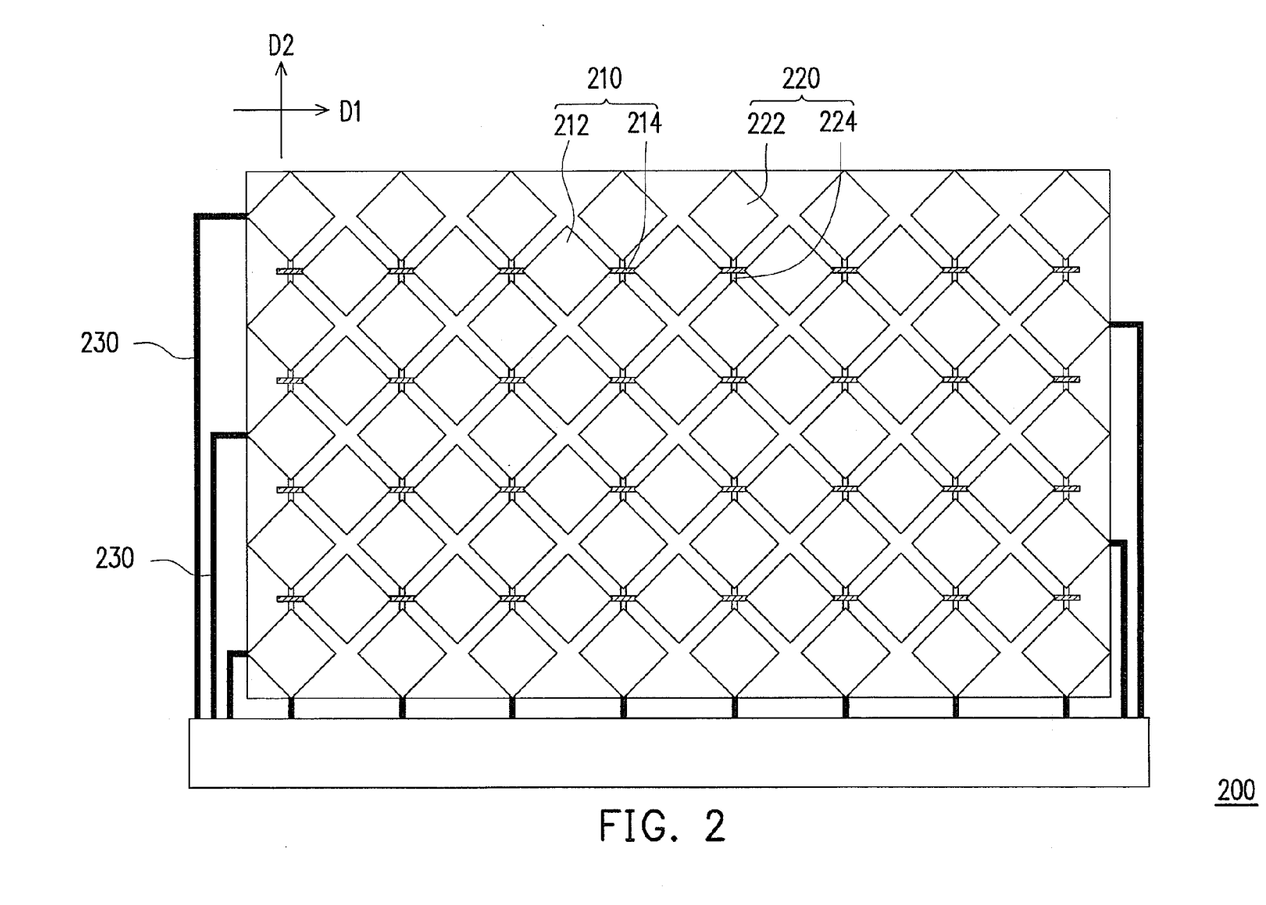
FIGS. 2 through 5 show top views of the touch panels according to the first through the fourth embodiments of the present invention.

FIGS. 2 through 5 show top views of the touch panels according to the first through the fourth embodiments of the present invention. Referring to FIG. 2 first, a touch panel 200 has at least one first sensing series 210 and at least one second sensing series 220. The first sensing series 210 extends along a first direction D1. The first sensing series 210 includes a plurality of first sensing pads 212 and at least one first bridge line 214. The first bridge line 214 connects two adjacent first sensing pads 212. A material of the first bridge line 214 differs from a material of the first sensing pads 212. The second sensing series 220 extends along a second direction D2. The first direction D1 is different from the second direction D2. For example, the first direction D1 is perpendicular to the second direction D2. The second sensing series 220 includes a plurality of second sensing pads 222 and at least one second bridge line 224. The second bridge line 224 connects two adjacent second sensing pads 222.

In addition, the touch panel 200 further includes a plurality of fan-out traces 230. The fan-out traces 230 are connected to the first sensing series 210 and the second sensing series 220. A material of the fan-out traces 230 may be substantially the same as or different from the material of the first sensing pads 212. The fan-out traces 230 are mainly used for transmitting sensing signals from the first sensing series 210 and the second sensing series 220 to a control circuit and/or for transmitting control signals from the control circuit to the first sensing series 210 and the second sensing series 220.

It should be noted that an electric conductivity of the first bridge line 214 is larger than an electric conductivity of the first sensing pads 212. For example, the material of the first sensing pads 212 includes transparent conductive oxide, and the material of the first bridge line 214 includes metal. In practice, the metal includes aluminum (Al), copper (Cu), molybdenum (Mo), MoAl alloy, titanium (Ti), TiAl alloy, silver (Ag), AgPd alloy or any combination of the foregoing. The transparent conductive oxide includes indium zinc oxide (IZO), indium tin oxide (ITO) or any combination of the foregoing. The above-listed materials are only exemplary and not intended to limit the present invention. According to the present embodiment, the sheet resistance of the first bridge line 214 is about 0.01 ohm per square ($\Omega/\square$) to 1000 ohm per square ($\Omega/\square$), and the sheet resistance of the first sensing pads 212 is about 0.01 ohm per square ($\Omega/\square$) to 1000 ohm per square ($\Omega/\square$). Preferably, the sheet resistance of the first bridge line 214 is about 0.1 ohm per square ($\Omega/\square$) to 100 ohm per square ($\Omega/\square$), and the sheet resistance of the first sensing pads 212 is about 1 ohm per square ($\Omega/\square$) to 1000 ohm per square ($\Omega/\square$).

Moreover, according to the present embodiment, the second sensing pads 222 and the second bridge line 224 are manufactured with an identical transparent conductive material, and the second sensing pads 222 are co-planar with the second bridge line 224, for example. In practice, the first sensing pads 212 may also be co-planar with the second sensing pads 222. If the transparent conductive oxide material is alternately disposed on different planes, images showing by the touch panel 200 would be of visual difference, i.e. a result of parallax. Therefore, in the present embodiment, the first sensing pads 212 and the second sensing pads 222 are rendered co-planar with each other to avoid generating undesirable visual difference in the touch panel 200.

Figure 3:
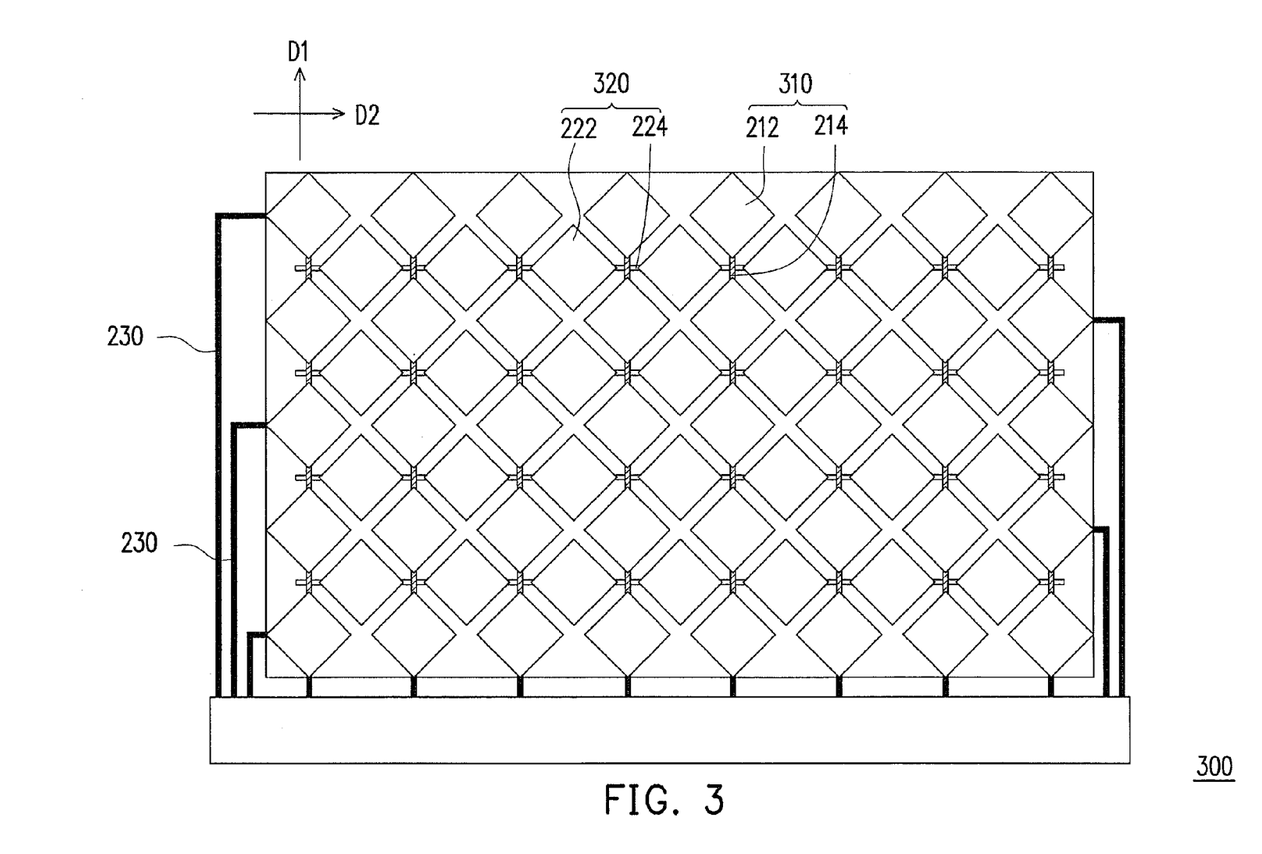

According to the present embodiment, a material of high electric conductivity is used to manufacture the first bridge lines 214. Hence, the touch panel 200 has a more satisfactory signal transmission quality at least in the first direction D1. Nevertheless, the present invention should not be construed as limited to the embodiments set forth herein. Referring to FIG. 3, a touch panel 300 is similar to the touch panel 200. Respective extending directions D1 and D2 of a first sensing series 310 and a second sensing series 320 of the touch panel 300 happen to be contrary to the first and the second directions designed for the touch panel 200. Meanwhile, in the present embodiment, the material of high electric conductivity is selectively used to manufacture the first bridge lines 214. In detail, in the touch panel 300, the first sensing pads 212 and the first bridge lines 214 manufactured with different materials constitute the first sensing series 310. In the meantime, second sensing pads 222 and second bridge lines 224 constituting the second sensing series 320 are manufactured with the same material, for example. In other words, the design of the present embodiment reduces a signal transmission sheet resistance of the touch panel in the first direction D1 and facilitates enhancing a signal transmission quality in the first direction D1.

Overall, if a material of higher electric conductivity such as metal is used to manufacture the first bridge lines 214 in FIG. 2 or in FIG. 3, the signal transmission sheet resistances of the touch panels 200 and 300 are effectively reduced. In other words, a material of higher electric conductivity is selected to manufacture a portion of the bridge lines so as to enhance the quality of overall signal transmission in the touch panel 200 or 300 in the present invention.

Figure 4:
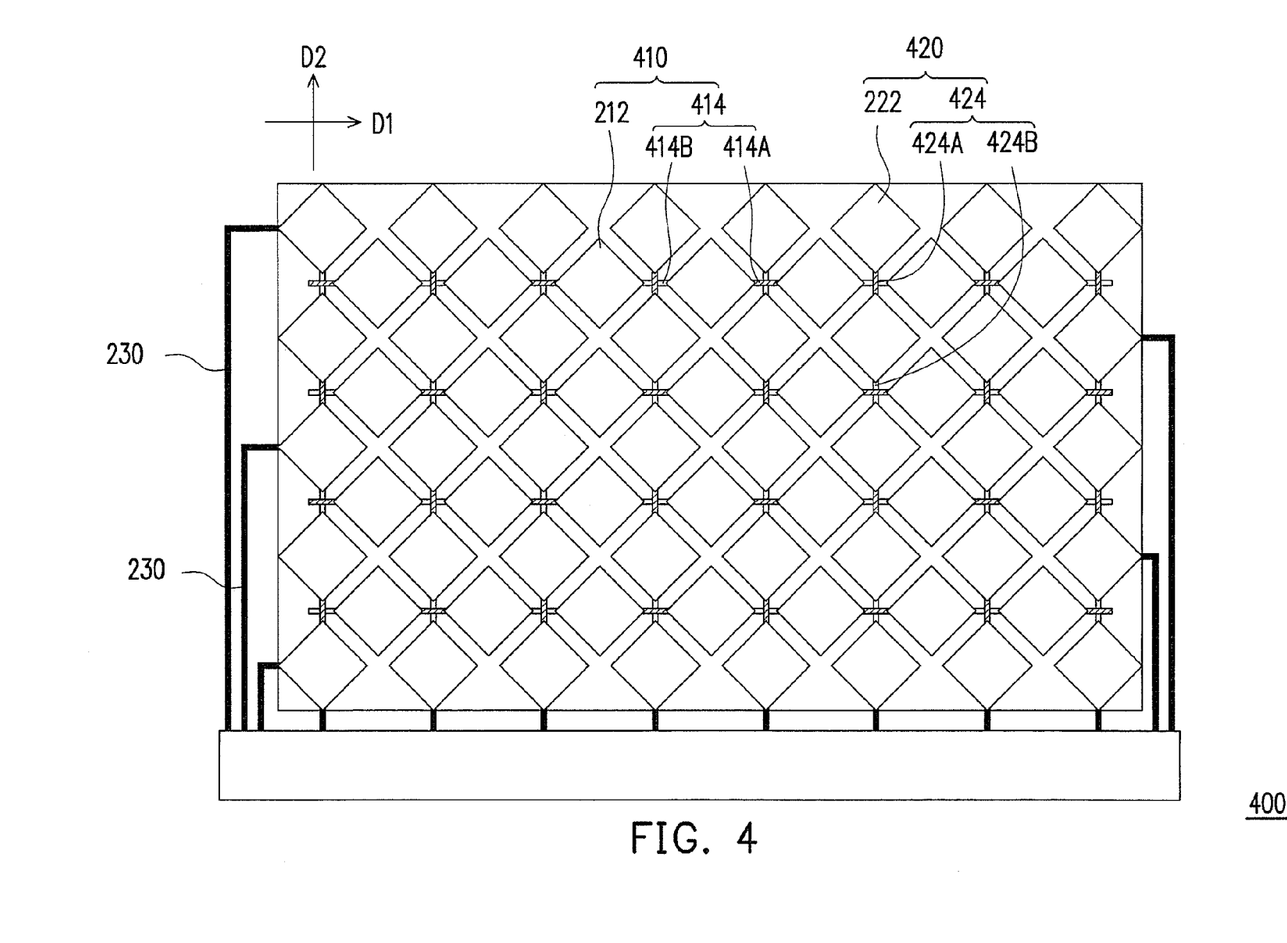

Obviously, the present invention is not limited to the present embodiment. Referring to FIG. 4, in a touch panel 400, a first bridge line 414 of a first sensing series 410 is constituted by first bridge line sections 414A and first bridge line sections 414B manufactured with different materials, for example. Meanwhile, a second bridge line 424 of a second sensing series 420 is also constituted by second bridge line sections 424A and second bridge line sections 424B manufactured with different materials, for example. For example, the first bridge line sections 414A and the second bridge line sections 424A are manufactured with materials of high electric conductivity such as metal.

In such designs, the transmission sheet resistances of the first bridge lines 414 and the second bridge lines 424 are reduced by employing the high electric conductivity materials. Therefore, the signal transmission quality of the touch panel 400 in the first direction D1 and the second direction D2 are effectively enhanced.

Figure 5:
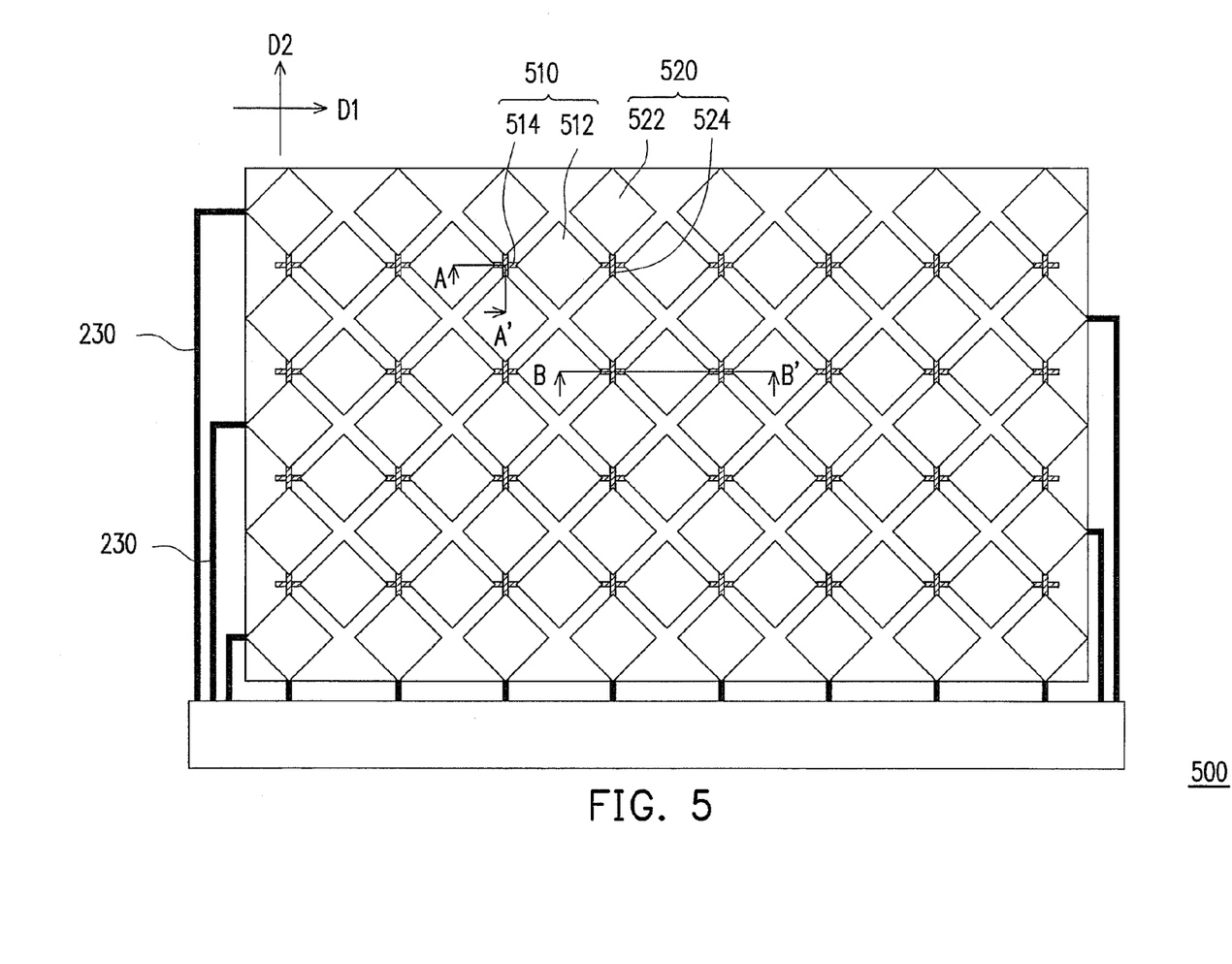

Furthermore, referring to FIG. 5, in order for a touch panel 500 to have more satisfactory signal transmission quality, all first bridge lines 514 and second bridge lines 524 are manufactured with materials of high electric conductivity such as metal. Accordingly, a first sensing series 510 and a second sensing series 520 both achieve satisfactory signal transmission quality. From FIGS. 2 through 5, the touch panels 200, 300, 400 and 500 have good signal transmission quality through selecting certain materials for the bridge lines. The first sensing series and the second sensing series may be disposed in a plurality of different ways in a cross-sectional structure and in a film layer stacking structure besides relative dispositions in the top-view structures as shown by FIGS. 2 through 5. In order to definitely express a design concept of the present invention, the touch panel 500 shown in FIG. 5 is taken for example to further explain a cross-sectional structure of the touch panel 500.

Figure 6:
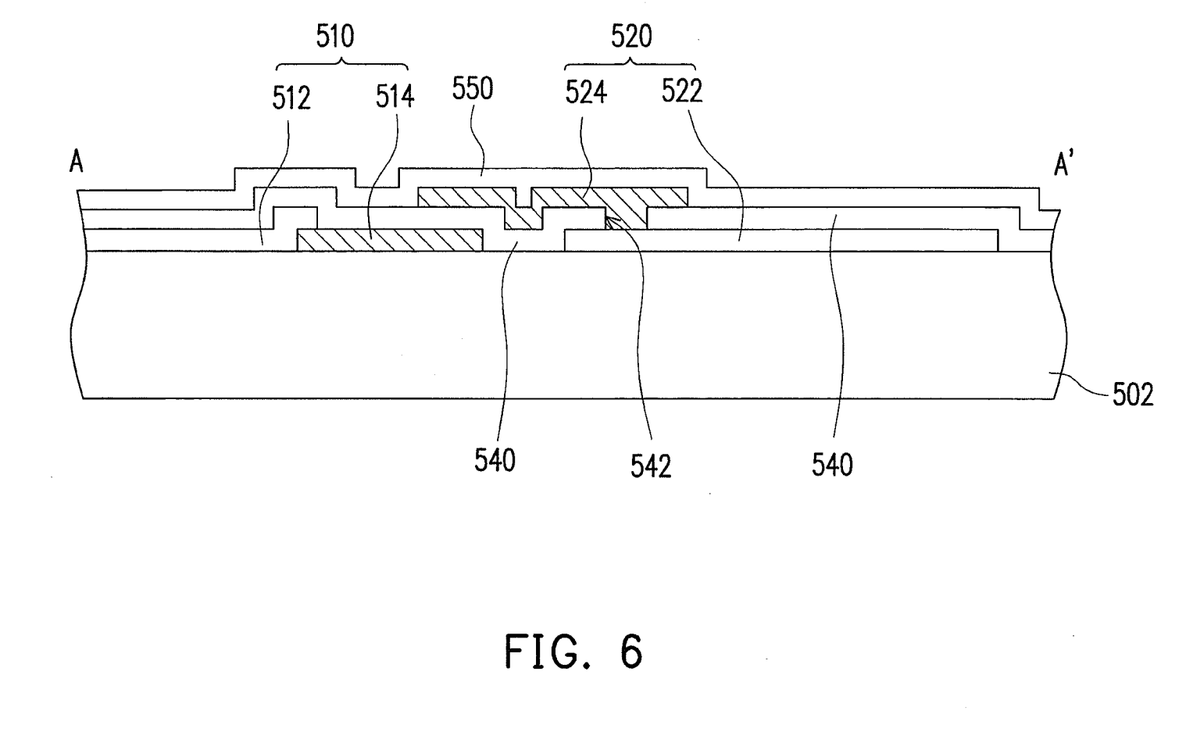
FIG. 6 is a cross-sectional view of a touch panel according to an embodiment of the present invention.

FIG. 6 is a cross-sectional view of a touch panel according to an embodiment of the present invention. FIG. 6 is a cross-sectional view of FIG. 5 along sectioning lines A-A'. Referring to both FIGS. 5 and 6, the touch panel 500 substantially includes a substrate 502, the first sensing series 510 and the second sensing series 520. The first sensing series 510 and the second sensing series 520 are both disposed on the substrate 502. Further, first sensing pads 512 are co-planar with second sensing pads 522, for example. In addition, the touch panel 500 further includes a first dielectric layer 540 covering the first sensing series 510 and the second sensing pads 522. The first dielectric layer 540 has a plurality of windows 542, for example. The second bridge lines 524 are disposed on the first dielectric layer 540 and connect the second sensing pads 522 through the windows 542. In other words, the second bridge lines 524 cross over the first bridge lines 514 and connect between two adjacent second sensing pads 522.

In order to provide proper protection, the touch panel 500 further includes a second dielectric layer 550 disposed on the first dielectric layer 540 to cover the first sensing series 510 and the second sensing series 520. It should be noted that according to the present embodiment the first bridge lines 514 and the second bridge lines 524 are both manufactured with materials of high electric conductivity, but the present invention is not limited to this embodiment. According to other embodiments, the first bridge line 514 and the second bridge line 524 interlaced with each other may have only one of them or a portion of them manufactured with materials of high electric conductivity, such as the designs of the touch panels 200, 300 and 400 as shown by FIGS. 2 through 4.

Still referring to both FIGS. 5 and 6, specifically, a manufacturing method of the touch panel 500 includes the following. First, form at least one first sensing series 510 on the substrate 502. The first sensing series 510 extends along a first direction D1. The first sensing series 510 includes a plurality of first sensing pads 512 and a plurality of first bridge lines 514. Each of the first bridge lines 514 connects two adjacent first sensing pads 512. Afterwards, form at least one second sensing series 520 on the substrate 502. The second sensing series 520 extends along a second direction D2. The first direction D1 is different from the second direction D2. For example, the first direction D1 is perpendicular to the second direction D2. Each of the second sensing series 520 includes a plurality of second sensing pads 522 and a plurality of second bridge lines 524. Each of the second bridge lines 524 connects two adjacent second sensing pads 522.

Specifically, in the present embodiment, the steps of forming the first sensing series 510 and the second sensing series 520 includes forming the first sensing pads 512, the first bridge lines 514 and the second sensing pads 522 on the substrate 502, so that the first sensing pads 512, the first bridge lines 514 and the second sensing pads 522 are co-planar with one another. In other words, the first sensing pads 512 and the second sensing pads 522 are formed in the same step and manufactured with the same material on a surface of the substrate 502. Thereafter, form a first dielectric layer 540 on the substrate 502 to cover the first sensing pads 512, the first bridge lines 514 and the second sensing pads 522. Then, form a plurality of windows 542 inside the first dielectric layer 540. Next, form the second bridge lines 524 on the first dielectric layer 540 such that each of the second bridge lines 524 connects the corresponding second sensing pads 522 through the corresponding windows 542. Furthermore, selectively form a second dielectric layer 550 on the first dielectric layer 540 to cover the first sensing series 510 and the second sensing series 520.

The first sensing pads 512 and the second sensing pads 514 are both manufactured with transparent conductive materials, for example. Usually, these transparent conductive materials would generate visual difference if they are disposed on different planes. According to the present embodiment, the first sensing pads 512 and the second sensing pads 522 are disposed on the same plane, and thus no visual difference exists between the first sensing pads 512 and the second sensing pads 522. Therefore, when the touch panel 500 is integrated with a display panel as a display having a touch-control function, the touch panel 500 has more satisfactory optical properties. For example, the display panel may be electrically connected to the touch panel 500, and the display panel includes a liquid crystal display (LCD) panel, an electroluminescent display panel, a plasma display panel or a micro electro-mechanical display panel. Certainly, the touch panels 200, 300 and 400 may also be electrically connected to a display panel to constitute as a display having a touch-control function.

Additionally, according to the present embodiment, the first bridge lines 514 and the second bridge lines 524 both have high electric conductivity. Hence, the signal transmission quality in the touch panel 500 is effectively enhanced. It is noted that in the touch panel 500, the first bridge lines 514 and the second bridge lines 524 have good electric conductivity, and therefore line widths of the first bridge lines 514 and the second bridge lines 524 may be appropriately reduced during manufacturing. Thus, dispositions of the first bridge lines 514 and the second bridge lines 524 do not negatively affect a light transmittance of the touch panel 500 easily, thereby maintaining good optical properties of the touch panel 500. Meanwhile, an overlapping area between the first bridge line 514 and the second bridge line 524 is effectively reduced, which facilitates reducing a parasitic capacitance between the two bridge lines. The smaller the parasitic capacitance between the first bridge lines 514 and the second bridge lines 524, the more sensitive the touch panel 500 is. In other words, reduction of the overlapping area between the first bridge line 514 and the second bridge line 524 facilitates improving the quality of the touch panel 500.

Figure 7:
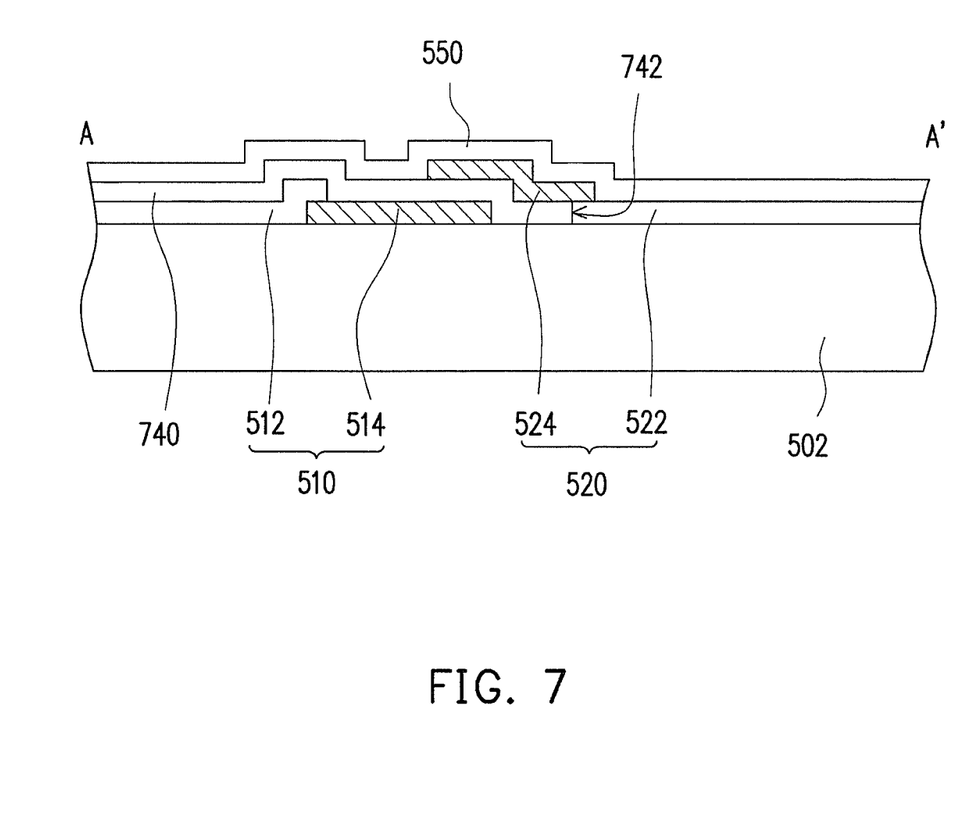
FIG. 7 is a cross-sectional view of a touch panel according to another embodiment of the present invention.

FIG. 7 is a cross-sectional view of a touch panel according to another embodiment of the present invention. FIG. 7 is a cross-sectional view of FIG. 5 along sectioning lines A-A'. Referring to both FIGS. 5 and 7, in the touch panel 500 of FIG. 5, the cross-sectional structure may be designed as disposing a first dielectric layer 740 on the substrate 502 to cover the first sensing series 510. Additionally, the first dielectric layer 740 has a plurality of openings 742 corresponding to the second sensing pads 522, for example. The second sensing pads 522 are disposed inside the corresponding openings 742, and each of the second bridge lines 524 crosses over the first dielectric layer 740 between two adjacent openings 742 and connects two adjacent second sensing pads 522 correspondingly. Meanwhile, the second dielectric layer 550 is disposed on the first dielectric layer 740 and covers the first sensing series 510 and the second sensing series 520.

According to the present embodiment, the first dielectric layer 740 has the opening 742 exactly capable of containing the second sensing pad 522. To achieve such dispositions, a method of forming the first sensing series 510 and the second sensing series 520 includes the following, for example. First, form the first sensing series 510 on the substrate 502. Thereafter, form a first dielectric layer 740 on the substrate 502 to cover the first sensing series 510. Then, form a plurality of openings 742 inside the first dielectric layer 740. Next, form the second sensing series 520. Form the second sensing pads 522 of the second sensing series 520 inside the corresponding openings 742 and co-planar with the first sensing pads 512. In other words, according to the present embodiment, the first dielectric layer 740 is formed first and then the second sensing pads 522 are manufactured. Moreover, the second sensing pads 522 of the present embodiment are not covered by the first dielectric layer 740, for example.

In practice, the second bridge lines 524 of the second sensing series 520 cross over the first dielectric layer 740 between two adjacent openings 742 to connect the two adjacent second sensing pads 524 correspondingly. According to the present embodiment, the first bridge lines 514 and the second bridge lines 524 are both manufactured with materials of high electric conductivity. Therefore, the first bridge lines 514 and the second bridge lines 524 have good signal transmission quality. The first bridge lines 514 and the second bridge lines 524 may have good signal transmission quality with smaller line widths, thereby reducing the parasitic capacitance between the first bridge lines 514 and the second bridge lines 524. According to other embodiments, the first bridge lines 514 and the second bridge lines 524 may certainly be manufactured partially with metal materials of high electric conductivity and partially with transparent conductive oxide. The present invention does not limit in this aspect.

Figure 8:
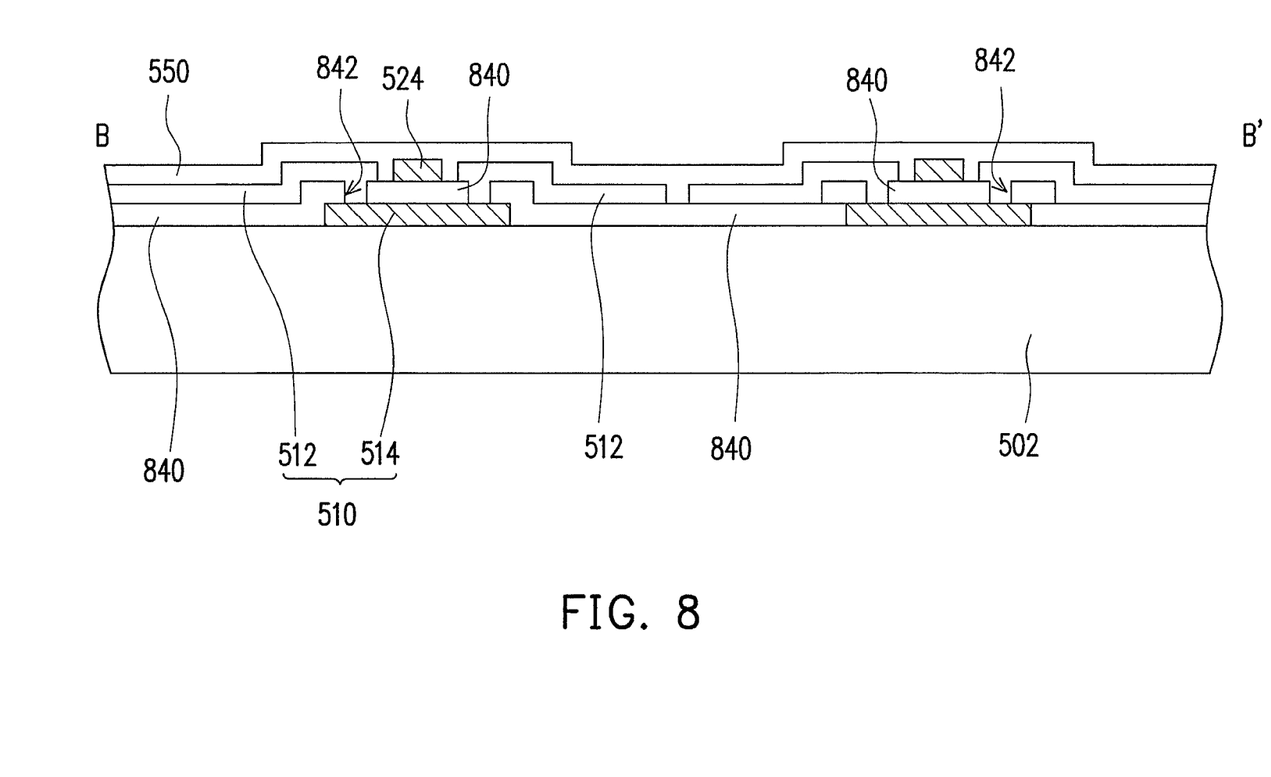
FIG. 8 is a cross-sectional view of a touch panel according to yet another embodiment of the present invention.

FIG. 8 is a cross-sectional view of a touch panel according to another embodiment of the present invention. FIG. 8 is a cross-sectional view of FIG. 5 along sectioning lines A-A'. Referring to both FIGS. 5 and 8, in a design of the cross-sectional structure of the touch panel 500, a first dielectric layer 840 may cover the first bridge lines 514. The first sensing pads 512 and the second sensing series 520 (not shown by FIG. 8) are disposed on the first dielectric layer 840. Additionally, the first dielectric layer 840 has a plurality of windows 842, and the first bridge line 514 connects the first sensing pads 512 through the corresponding window 842. Furthermore, the second dielectric layer 550 covers the first sensing series 510 and the second sensing series 520.

According to the present embodiment, the first dielectric layer 840 only covers the first bridge lines 514. A portion of the first dielectric layer 840 is disposed between the first sensing pads 512 and the substrate 502, and a portion of the first dielectric layer 840 is disposed between the second sensing pads 522 (not shown by FIG. 8) and the substrate 502. In other words, according to the present embodiment, the first sensing pads 512 and the second sensing pads 522 (not shown by FIG. 8) are simultaneously disposed on the first dielectric layer 840. Thus, the first sensing pads 512 are substantially co-planar with the second sensing pads 522 (not shown by FIG. 8) so that the touch panel 500 achieves good optical properties. Certainly, according to the present embodiment, the first bridge lines 514 and the second bridge lines 524 may be entirely or only partially manufactured with metal materials of high electric conductivity. Thus, the touch panel 500 has good signal transmission quality.

Specifically, the cross-sectional structure of the touch panel 500 as shown by FIG. 8 is manufactured by the following. First, form the first bridge lines 514 on the substrate 502. Thereafter, form the first dielectric layer 840 over the first bridge lines 514 and the substrate 502. Form the plurality of windows 842 in the first dielectric layer 840. The windows 842 substantially expose a portion of each of the first bridge lines 514. Next, form the first sensing pads 512 and the second sensing series 520 on the first dielectric layer 840. Herein FIG. 8 only shows the second bridge lines 524. At the same time of forming the first sensing pads 512, the first sensing pads 512 are electrically connected to the first bridge line 514 through the window 842. Afterwards, form the second dielectric layer 550 over the first sensing series 510 and the second sensing series 520.

According to the present embodiment, all the sensing pads 512 and 522 are disposed on a surface of the first dielectric layer 840. In other words, the first sensing pads 512 and the second sensing pads 522 are substantially disposed on the same plane. At this moment, the touch panel 500 would not have any visual difference derived from the first sensing pads 512 and the second sensing pads 522 being disposed on different planes. In other words, when the touch panel 500 is designed to be integrated with a display panel as a touch screen display, the touch screen display achieves good display quality.

Figure 9:
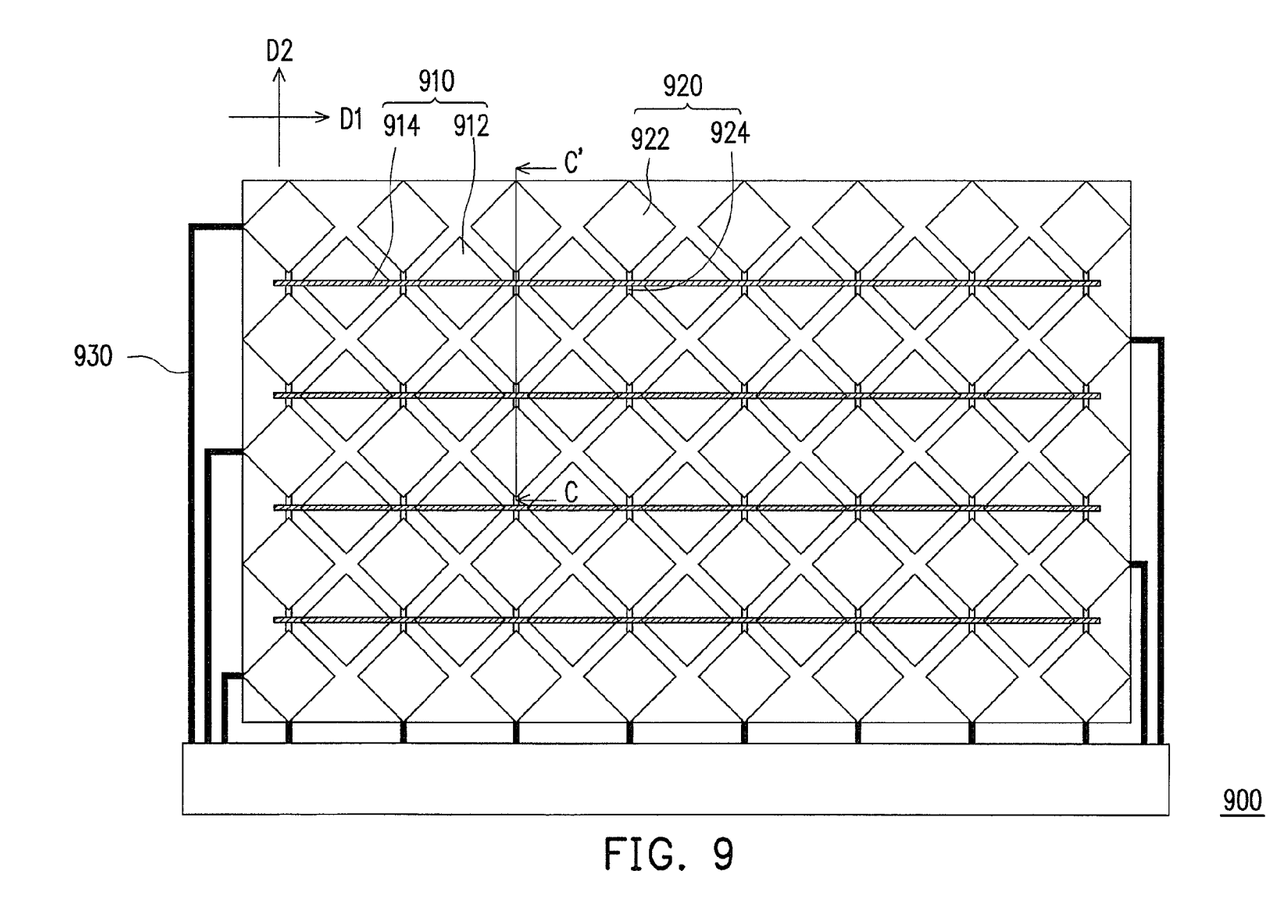
FIG. 9 shows the touch panel according to the fifth embodiment of the present invention.

Further, FIG. 9 shows the touch panel according to the fifth embodiment of the present invention. Referring to FIG. 9 first, a touch panel 900 has a first sensing series 910 and a second sensing series 920. The first sensing series 910 extends along a first direction D1 and includes a plurality of first sensing pads 912 and a first bridge line 914. The first bridge line 914 connects all of the first sensing pads 912, for example. A material of the first bridge line 914 differs from a material of the first sensing pads 912. The second sensing series 920 extends along a second direction D2. The first direction D1 is different from the second direction D2. The second sensing series 920 includes a plurality of second sensing pads 922 and a plurality of second bridge lines 924. Each of the second bridge lines 924 connects two adjacent second sensing pads 922. Moreover, the touch panel 900 further has a plurality of fan-out traces 930 so that signals on the first sensing pads 912 and the second sensing pads 922 are transmitted to corresponding control circuits.

According to the present embodiment, the first bridge line 914 connects all of the first sensing pads 912 on the first sensing series 910. In other words, the first bridge line 914 is a single line overlapping and connecting with the first sensing pads 912 on the same first sensing series 910. Further, the first bridge line 914 is manufactured with a material of high electric conductivity, such as metal. Generally, the first bridge line 914 manufactured with metal provides very good signal transmission quality. However, a light-shielding property of metal itself may result in poor light transmittance or uneven visual effect in the touch panel 900. Nevertheless, according to the present embodiment, since use of metal as the material has produced very good signal transmission quality, the first bridge line 914 may be designed to have a narrower line width. For example, the line width of the first bridge line 914 is smaller than a line width of the second bridge line 924. In other words, the line width of the first bridge line 914 may be appropriately reduced to avoid uneven light transmittance experienced by human eyes when viewing the touch panel 900.

Overall, the first bridge line 914 with a high electric conductivity and in long strip shape is employed to connect all the corresponding first sensing pads 912 in the present embodiment. As a result, the signal transmission quality of the touch panel 900 is effectively enhanced at least in the first direction D1. Certainly, to further enhance the signal transmission quality of the touch panel 900 in the second direction D2, the second bridge lines 924 may also be selectively manufactured with a metal material of high electric conductivity. The present invention does not limit the material of the second bridge lines 924. Furthermore, according to other embodiments, the designs of the first bridge line 914 and the second bridge lines 924 are interchangeable so that the second bridge lines 924 may serve as transmission lines of high electric conductivity to connect all of the second sensing pads 922. The present invention does not limit in this aspect.

Figure 10:
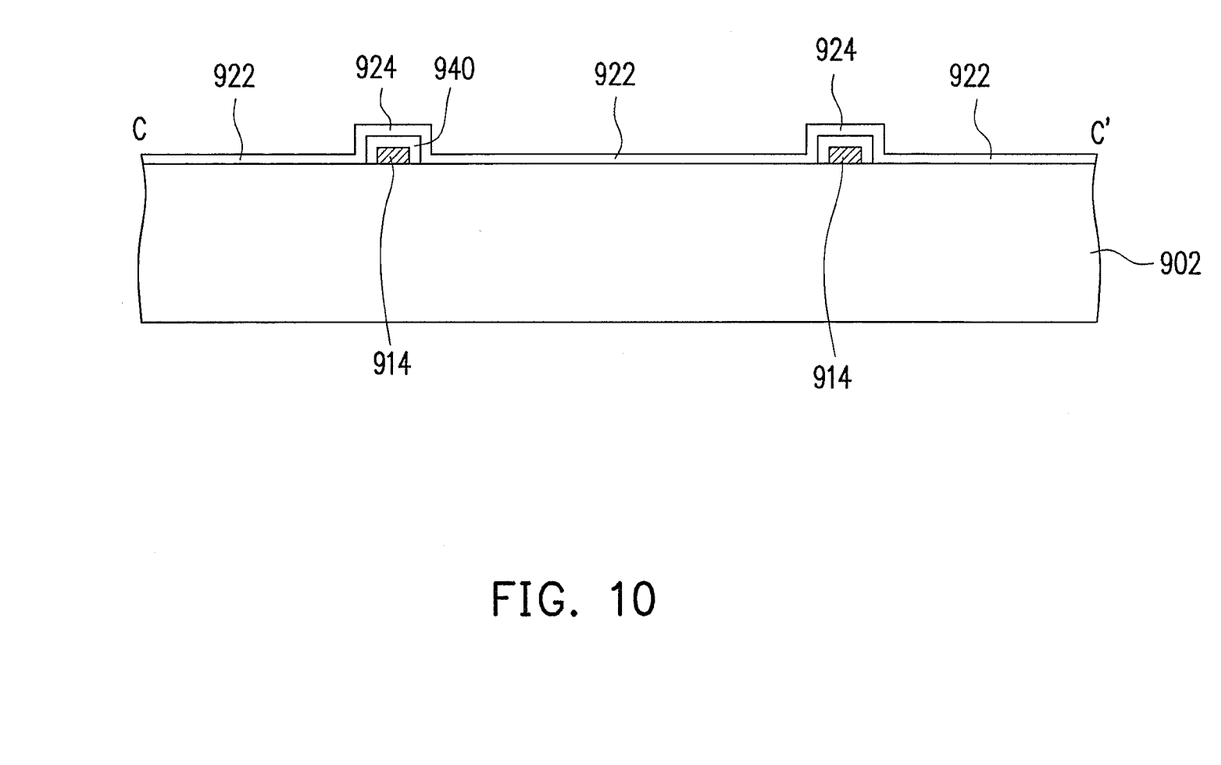
FIG. 10 is a cross-sectional view of FIG. 9 along sectioning lines C-C'.

Specifically, FIG. 10 is a cross-sectional view of FIG. 9 along sectioning lines C-C'. Referring to both FIGS. 9 and 10, the first sensing series 910 and the second sensing series 920 are substantially disposed on a substrate 902 to constitute the touch panel 900. A manufacturing method of the touch panel 900 includes first forming the first bridge line 914 on the substrate 902. Then, form a first dielectric layer 940 to cover the first bridge line 914. From a plurality of windows (not shown) inside the first dielectric layer 940, for example. Afterwards, form the first sensing pads 912 and the second sensing series 920 on the substrate 902. At this moment, the first bridge line 914 is electrically connected to the first sensing pads 912 through the corresponding window (not shown). The second bridge lines 924 cross over the first dielectric layer 940 between two adjacent second sensing pads 922 to connect the second sensing pads 922.

According to the present embodiment, besides the first bridge line 914 directly disposed on the substrate 902, the first sensing pads 912 and the second sensing pads 922 may also be directly disposed on the substrate 902. In other words, the first sensing pads 912 and the second sensing pads 922 are disposed on the same plane. In all of the embodiments disclosed by the present invention, the sensing pads are all designed as disposed on the same plane, but the present invention is not limited to these embodiments. According to other embodiments, the sensing pads may also be substantially disposed on different planes.

In summary, the touch panel and the display constituted by the touch panel of the present invention employ materials of higher electric conductivity to manufacture at least a portion of the first bridge lines and the second bridge lines, thereby effectively reducing the transmission sheet resistance of the touch panel. Therefore, the touch panel and the display provided by the present invention achieve low signal transmission sheet resistance. Additionally, use of highly conductive materials facilitates reducing the parasitic capacitance among the sensing series in the touch panel of the present invention, so that the touch panel has good touch sensitivity. It is known from the manufacturing process of the touch panel in the present invention that the same top-view structure may appear in a plurality of different cross-sectional designs while each of the sensing series is manufactured by different step sequences. As a result, the touch panel of the present invention has even more varieties.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A touch panel, comprising:
a substrate having a top surface;
a plurality of first sensing series disposed on the substrate, each of the first sensing series extending along a first direction, wherein one of the first sensing series comprises:
a plurality of first sensing pads disposed on the top surface; and
a plurality of first bridge lines disposed on the top surface, the first bridge lines being separated from one another, wherein each of the first bridge lines is con- nected with two adjacent first sensing pads correspondingly, and the first sensing pads comprises transparent conductive oxide and the material of the first bridge lines comprises metal; and a plurality of second sensing series disposed on the top surface, each of the second sensing series extending along a second direction, wherein the first direction is different from the second direction.

2. The touch panel as claimed in claim 1, wherein one of the second sensing series comprises:

a plurality of second sensing pads; and a plurality of second bridge lines separated from one anther, wherein each of the second bridge lines is connected with two adjacent first sensing pads corresponding, and a material of the second bridge lines is different from a material of the second sensing pads.

3. The touch panel as claimed in claim 2, wherein at least a portion of the second bridge lines have an electric conductivity higher than an electric conductivity of the second sensing pads, a material of the second sensing pads comprises transparent conductive oxide, and a material of the second bridge lines comprises metal.

4. The touch panel as claimed in claim 2, wherein the first sensing pads are co-planar with the second sensing pads.

5. The touch panel as claimed in claim 2, further comprising a first dielectric layer disposed on the substrate to cover the first sensing series and the second sensing pads, wherein the first dielectric layer has a plurality of windows, the second bridge lines are disposed on the first dielectric layer, and the second bridge lines are connected to the second sensing pads through the windows.

6. The touch panel as claimed in claim 5, further comprising a second dielectric layer disposed on the first dielectric layer to cover the first sensing series and the second sensing series.

7. The touch panel as claimed in claim 2, further comprising a first dielectric layer disposed on the substrate and covering the first sensing series, the first dielectric layer having a plurality of openings corresponding to the second sensing pads, the second sensing pads being disposed inside the corresponding openings, each of the second bridge lines crossing over the first dielectric layer between two adjacent openings and connecting the two adjacent second sensing pads correspondingly.

8. The touch panel as claimed in claim 7, further comprising a second dielectric layer disposed on the first dielectric layer and covering the first sensing series and the second sensing series.

9. The touch panel as claimed in claim 1, further comprising a first dielectric layer disposed on the substrate and covering the first bridge lines, wherein the first sensing pads and the second sensing series are disposed on the first dielectric layer, the first dielectric layer has a plurality of windows, and the first bridge lines connect the first sensing pads through the corresponding windows.

10. The touch panel as claimed in claim 9, further comprising a second dielectric layer disposed on the first dielectric layer and covering the first sensing series and the second sensing series.

11. The touch panel as claimed in claim 1, further comprising a plurality of fan-out traces disposed on the substrate, wherein the fan-out traces are connected to the first sensing series and the second sensing series, and a material of the fan-out traces is the same as the material of the first sensing pads.

12. The touch panel as claimed in claim 1, further comprising a plurality of fan-out traces disposed on the substrate, wherein the fan-out traces are connected to the first sensing series and the second sensing series, and a material of the fan-out traces differs from the material of the first bridge lines.

13. The touch panel as claimed in claim 1, wherein a sheet resistance of the first bridge lines is about 0.01 ohm per square to 1000 ohms per square, and a sheet resistance of the first sensing pad is about 0.01 ohm per square to 1000 ohms per square.

14. The touch panel as claimed in claim 1, wherein an electric conductivity of the first bridge lines is higher than an electric conductivity of the first sensing pads.

15. The touch panel as claimed in claim 1, wherein a sheet resistance of the first bridge lines is lower than a sheet resistance of the first sensing pads.

16. A touch panel, comprising:

a substrate having a top surface;

a plurality of first sensing series disposed on the substrate, each of the first sensing series extending along a first direction, wherein one of the first sensing series comprises:

a plurality of first sensing pads disposed on the top surface; and a plurality of first bridge lines disposed on the top surface, the first bridge lines being separated from one another, wherein each of the first bridge lines is connected with two adjacent first sensing pads correspondingly, a sheet resistance of the first bridge lines is lower than a sheet resistance of the first sensing pads, and the first sensing pads comprises transparent conductive oxide and the material of the first bridge lines comprises metal; and a plurality of second sensing series disposed on the top surface, each of the second sensing series extending along a second direction, wherein the first direction is different from the second direction.

17. The touch panel as claimed in claim 16, wherein one of the second sensing series comprises:

a plurality of second sensing pads; and a plurality of second bridge lines separated from one anther, wherein each of the second bridge lines is connected with two adjacent first sensing pads corresponding, and a material of the second bridge lines is different from a material of the second sensing pads.

18. The touch panel as claimed in claim 17, wherein at least a portion of the second bridge lines have an electric conductivity higher than an electric conductivity of the second sensing pads, a material of the second sensing pads comprises transparent conductive oxide, and a material of the second bridge lines comprises metal.

19. The touch panel as claimed in claim 1, wherein the plurality first bridge lines are arranged along the first direction, each of the first bridge lines is merely connected with two adjacent first sensing pads correspondingly, a plurality of gaps are arranged along the first direction and each of the plurality of gaps is formed between two adjacent first bridge lines.

20. A touch panel, comprising:

a substrate;

a plurality of first sensing series disposed on the substrate, each of the first sensing series extending along a first direction, wherein one of the first sensing series comprises:

a plurality of first sensing pads; and a plurality of first bridge lines separated from one another and arranged along the first direction, wherein each of the first bridge lines is merely connected with two adjacent first sensing pads correspondingly, a plurality of gaps are arranged along the first direction, each of the gaps is formed between two adjacent first bridge lines, and the first sensing pads comprises transparent conductive oxide and the material of the first bridge lines comprises metal; and a plurality of second sensing series disposed on the substrate and each of which extending along a second direction, wherein the first direction is different from the second direction.

21. The touch panel as claimed in claim 20, wherein the substrate has a top surface and the plurality of first sensing pads, the plurality of first bridge lines, the plurality of second sensing series, and the plurality of gaps are located on the top surface.

* * * * *